(No Model.)
R. O. S. BOSWORTH.
GATE.
No. 525,184. Patented Aug. 28, 1894.
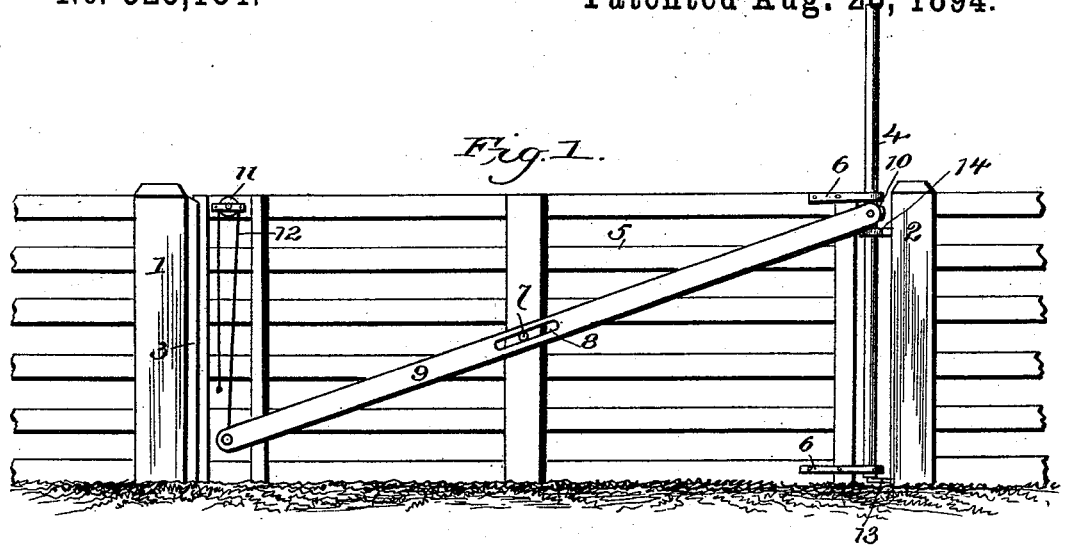
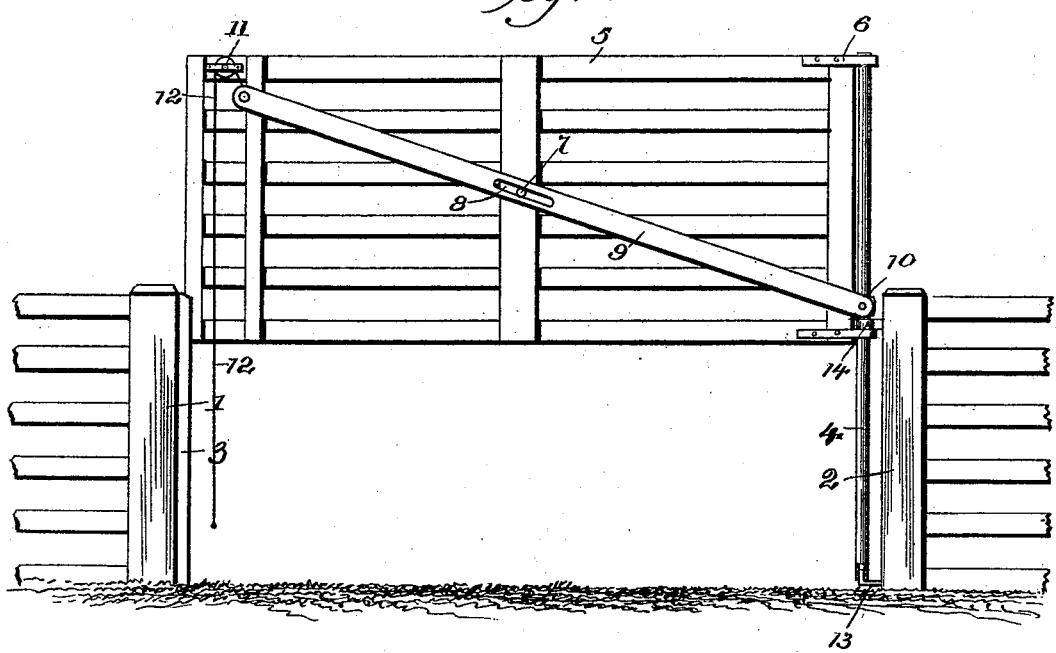
Witnesses
J. W. Reynolds
Chas. S. Hyer
Inventor
Richard O. S. Bosworth
By John Wedderburn
Attorney

UNITED STATES PATENT OFFICE.

RICHARD O. S. BOSWORTH, OF PORTLAND, INDIANA, ASSIGNOR TO MINNIE L. BOSWORTH, OF SAME PLACE.

GATE.

SPECIFICATION forming part of Letters Patent No. 525,184, dated August 28, 1894.

Application filed February 15, 1894. Serial No. 500,261. (No model.)

*To all whom it may concern:*

Be it known that I, RICHARD O. S. BOSWORTH, a citizen of the United States, residing at Portland, in the county of Jay and State of Indiana, have invented certain new and useful Improvements in Gates; and I do hereby declare the following to be a full, clear, and exact description of the invention, such as will enable others skilled in the art to which it appertains to make and use the same.

This invention relates to certain new and useful improvements in gates, and has for its object to provide means for elevating the gate in order to let small stock pass thereunder, and also to prevent the gate from being racked or injured by dragging over clods or other obstructions on the surface of the ground, or to prevent the end from similarly dragging upon the ground.

A further object is to provide means for lowering the gate to such a degree as to prevent the smallest reptile from crawling thereunder, in order to retain very small stock within a desired inclosure.

With these and other objects in view, the invention consists of the construction and arrangement of the several parts which will be more fully hereinafter described and claimed.

In the drawings: Figure 1 is an elevation of the gate embodying the invention, shown closed. Fig. 2 is a similar view of the improved gate shown raised, or elevated to its full extent.

Similar numerals of reference are employed to indicate corresponding parts in both views.

Referring to the drawings, the numeral 1 designates the outer post, and 2 the inner or hinge post, the first named post is provided with a suitable stop 3 and to the last mentioned post is attached a guide rod 4 arranged vertically and extending some distance above the height of the said post 2. To the guide rod 4 is hinged the gate 5 by means of looped hinges 6 which move vertically over the said guide rod 4. To the central vertical strip of the gate is attached a pin 7 which projects through an elongated slot 8 formed in a liftting bar or lever 9, the latter having one end hinged to a slide 10 on the rod 4, and its opposite end unattached and free to have vertical movement. By operating the said lifting lever or bar 9 to elevate the gate, the pin 7 moves in the slot 8 and the said lifting lever or bar assumes the position shown in Fig. 2, it being understood that the angle of the said lifting lever or bar will vary in accordance with the height to which the gate is elevated, and the leverage is such that a simple upward movement on the said lever or bar 9 will actuate the gate in the manner desired and produce the required degree of elevation. To the top of the gate is attached a small pulley 11 engaged by a rope or cord 12, by means of which the lever may be pulled to the top of the gate. The elevating feature of the gate is of exceptional advantage. One of the important features of the construction is the rod 4 which is made hollow and fitted over an angular support 13 attached to the post 2, while to the upper part of said post 2 is attached a loop 14 which surrounds the said rod in such manner as not to interfere with the action of the hinges 6 in sliding upward or downward on the said rod. It will also be understood that the gate may be opened or closed after the manner of an ordinary hinged gate in addition to the elevating feature thereof.

Having thus described the invention, what is claimed as new is—

In a gate, the combination of a gate proper having a pin extending therefrom, a rod on which said gate has vertically sliding movement, an elevating lever or bar hingedly secured to said rod at its inner end and having the outer end thereof free for vertical adjustment, said elevating lever or bar being provided with a slot with which the said pin engages, a pulley at the upper outer portion of the gate and a rope or cord engaging said pulley and attached to the outer free end of the lever, substantially as and for the purposes specified.

In testimony whereof I have signed this specification in the presence of two subscribing witnesses.

RICHARD O. S. BOSWORTH.

Witnesses:
JAMES H. WIGGS,
S. B. MOORE.